(12) United States Patent
Kinpara

(10) Patent No.: US 10,892,669 B2
(45) Date of Patent: Jan. 12, 2021

(54) ROTOR CORE AND MANUFACTURING METHOD FOR ROTOR CORE

(71) Applicant: TOYOTA JIDOSHA KABUSHIKI KAISHA, Toyota (JP)

(72) Inventor: Hiroshi Kinpara, Miyoshi (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 42 days.

(21) Appl. No.: 16/437,493

(22) Filed: Jun. 11, 2019

(65) Prior Publication Data

US 2020/0067384 A1    Feb. 27, 2020

(30) Foreign Application Priority Data

Aug. 23, 2018    (JP) .................... 2018-156320

(51) Int. Cl.

| | | |
|---|---|---|
| *H02K 9/22* | (2006.01) | |
| *H02K 1/27* | (2006.01) | |
| *F28F 21/00* | (2006.01) | |
| *H02K 15/03* | (2006.01) | |
| *H02K 15/12* | (2006.01) | |
| *H02K 1/28* | (2006.01) | |

(52) U.S. Cl.
CPC ............ *H02K 9/22* (2013.01); *F28F 21/00* (2013.01); *H02K 1/276* (2013.01); *H02K 1/28* (2013.01); *H02K 15/03* (2013.01); *H02K 15/12* (2013.01)

(58) Field of Classification Search
CPC .......... H02K 9/22; H02K 1/276; H02K 15/03; H02K 15/12; H02K 1/28; F28F 21/00
See application file for complete search history.

(56) References Cited

U.S. PATENT DOCUMENTS

| | | | | |
|---|---|---|---|---|
| 2009/0322180 | A1* | 12/2009 | Nonaka | ............... H02K 15/028 310/215 |
| 2012/0206007 | A1* | 8/2012 | Kitagawa | ............. H02K 1/2766 310/156.08 |
| 2012/0319507 | A1 | 12/2012 | Ueno et al. | |
| 2013/0106210 | A1* | 5/2013 | Tsutsui | ................... H02K 5/128 310/52 |

FOREIGN PATENT DOCUMENTS

| | | |
|---|---|---|
| JP | 09-163649 A | 6/1997 |
| JP | 2006-002144 A | 1/2006 |
| WO | 2011/108098 A1 | 9/2011 |

\* cited by examiner

*Primary Examiner* — Emily P Pham
(74) *Attorney, Agent, or Firm* — Sughrue Mion, PLLC

(57) ABSTRACT

A rotor core includes a laminated iron core in which an electrical steel sheets are laminated, a magnet slot being provided in the laminated iron core and extending in a lamination direction of the laminated iron core, and a magnet that is fixed to an inside of the magnet slot through resin. The resin includes a filler, and the filler has a length in a longitudinal direction larger than a length in a width direction. The filler is oriented such that the longitudinal direction is directed towards a surface of the magnet.

3 Claims, 6 Drawing Sheets

FIG. 5
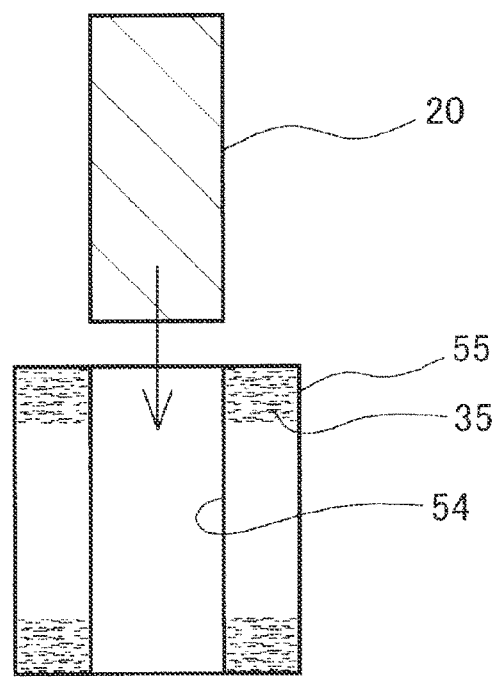
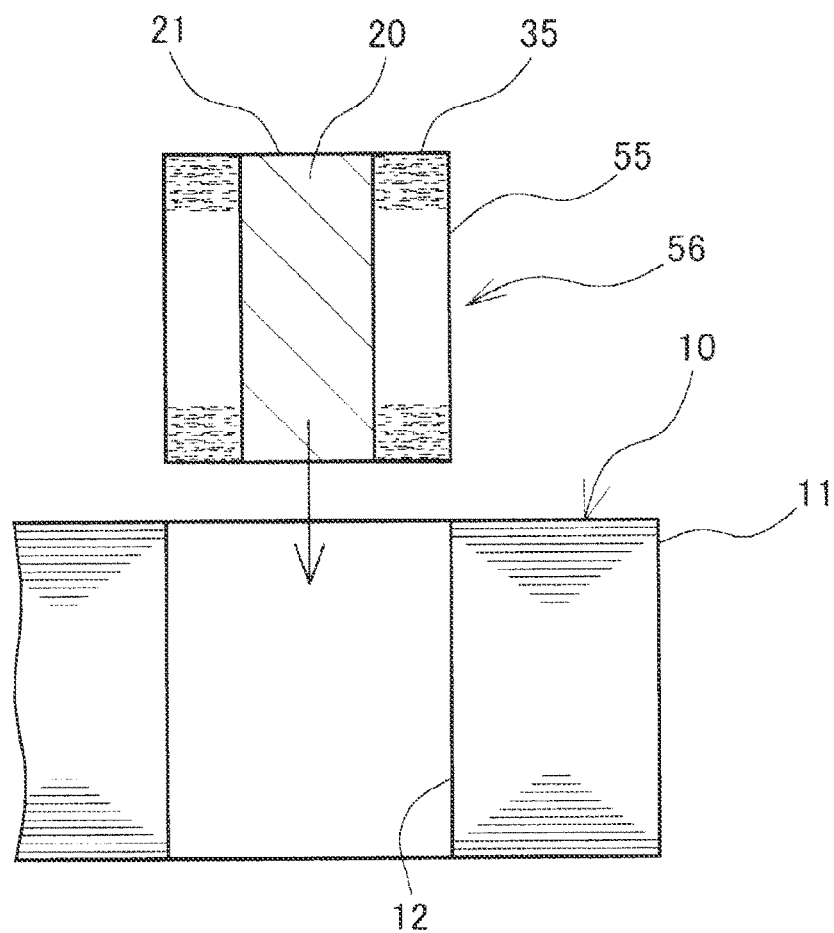

ROTOR CORE AND MANUFACTURING METHOD FOR ROTOR CORE

INCORPORATION BY REFERENCE

The disclosure of Japanese Patent Application No. 2018-156320 filed on Aug. 23, 2018 including the specification, drawings and abstract is incorporated herein by reference in its entirety.

BACKGROUND

1. Technical Field

The disclosure relates to a structure of a rotor core into which a magnet is incorporated, and to a manufacturing method for the rotor core.

2. Description of Related Art

There is a motor in which a rotor core is used. In the rotor core, an adhesion sheet made of thermosetting resin is placed between an inner surface of a magnet slot provided in a laminated iron core and a magnet, and the adhesion sheet is heated and cured so that the magnet is fixed to an inside of the magnet slot (for example, see Japanese Unexamined Patent Application Publication No. 9-163649 (JP 9-163649 A)).

SUMMARY

When a large current flows and a rotor is rotated at a high speed, a large induced current flows in a magnet incorporated in a rotor core, and an amount of heat generated in the magnet increases. However, when the magnet is fixed to the magnet slot by using resin like the related art described in JP 9-163649 A, because thermal conductivity of the resin is low, heat generated in the magnet cannot be dissipated to an outside sufficiently, temperature of the magnet becomes high and demagnetization occurs. Thus, performance of the motor may be degraded.

The disclosure improves heat dissipation performance of a magnet incorporated in a rotor core.

A first aspect of the disclosure includes a laminated iron core, and a magnet. In the laminated iron core, an electrical steel sheets are laminated. The laminated iron core provides a magnet slot that extends in a lamination direction of the laminated iron core. The magnet is fixed to an inside of the magnet slot through resin. The resin includes a filler, and a length of the filler in a longitudinal direction is larger than a length in a width direction. The filler is oriented such that the longitudinal direction is directed towards a surface of the magnet.

With the foregoing configuration, the longitudinal direction of the filler with good thermal conductivity is oriented in the direction towards the surface of the magnet. Therefore, a quantity of heat dissipated from the magnet surface to an outside is increased, thereby improving heat dissipation performance of the magnet to the outside.

In the rotor core, the filler may be a non-magnetic body.

With the foregoing configuration, the filler is a non-magnetic body. Therefore, there is no influence on a behavior of an eddy magnetic flux such as a reduction in an eddy magnetic flux density even when the filler comes into contact with the magnet or the electrical steel sheet. Thus, it is possible to restrain a decrease in an output of a motor.

A second aspect of the disclosure is a manufacturing method for a rotor core. The rotor core includes a laminated iron core, and a magnet. In the laminated iron core, an electrical steel sheets are laminated. The laminated iron core provides a magnet slot that extends in a lamination direction of the laminated iron core. The magnet is fixed to an inside of a magnet slot through filler resin. The filler resin includes a filler. The manufacturing method includes kneading step kneads the filler and a resin material, the filler having a length in a longitudinal direction larger than a length in a width direction, forming step forms a sheet by shaping a kneaded matter made of the filler and the resin material into a flat plate shape and drying the shaped kneaded matter, lamination step makes a laminate by laminating the sheet, pressing step makes the filler resin by pressing the laminate in the lamination direction such that the longitudinal direction of the filler is oriented so as to be directed along a lamination surface, and fixing step that fixes the magnet to the magnet slot through the filler resin by disposing the filler resin between the magnet and an inner surface of the magnet slot such that the lamination surface of the sheet is directed towards a surface of the magnet.

With the foregoing configuration, the longitudinal direction of the filler with good thermal conductivity is oriented in a direction towards the surface of the magnet, and a quantity of heat dissipated from the magnet surface to the outside is increased. Thus, it is possible to provide a rotor core with good heat dissipation performance of the magnet to the outside.

The disclosure is able to improve dissipation performance of the magnet incorporated in the rotor core.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a view describing a part of a fixing step of the manufacturing steps for the rotor core according to the embodiment.

DETAILED DESCRIPTION OF EMBODIMENTS

Figure 1:
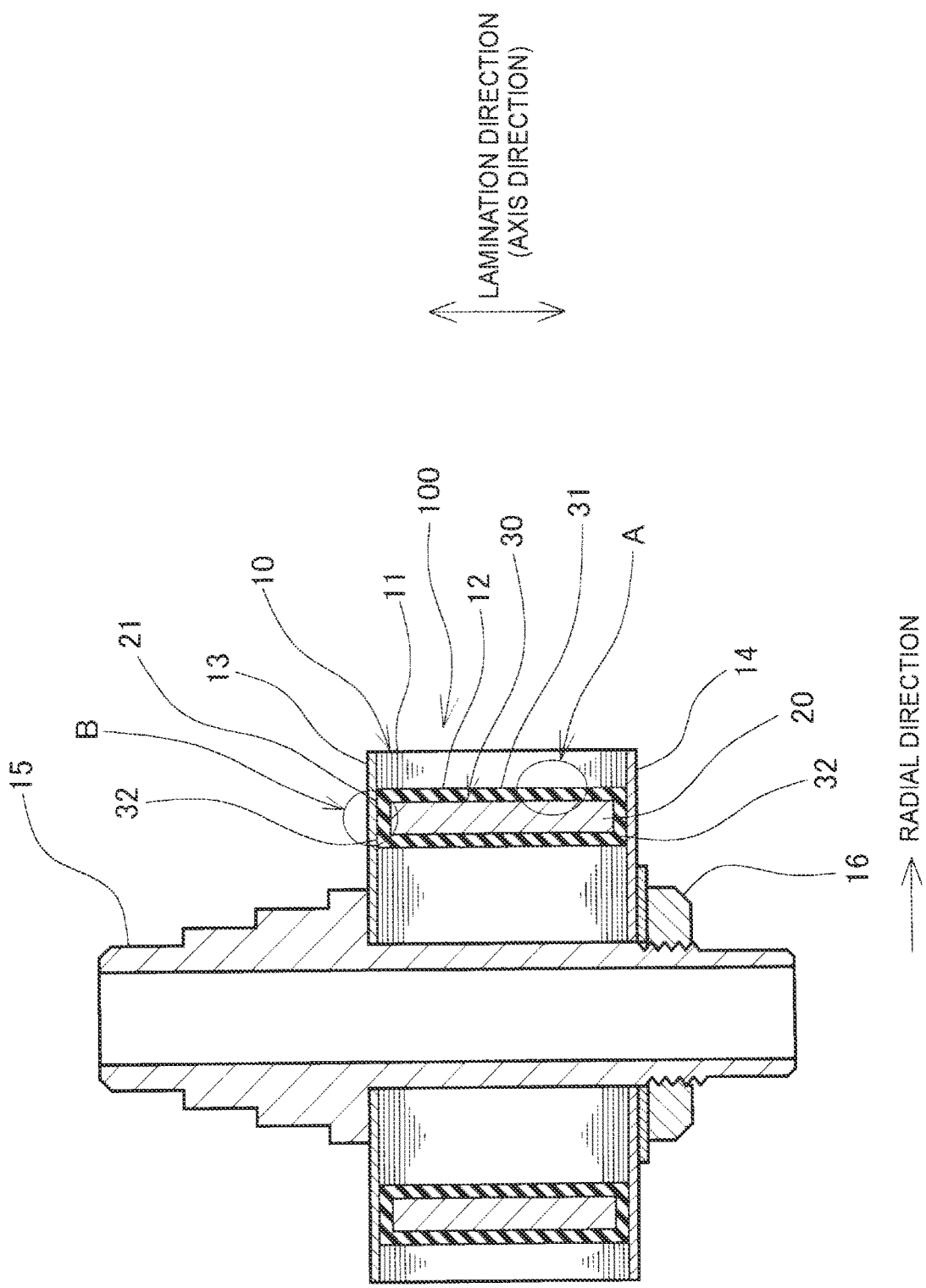
FIG. 1 is a sectional view of a rotor core according to an embodiment.

Hereinafter, a rotor core 100 according to an embodiment is described with reference to the drawings. The rotor core 100 includes a laminated iron core 10 in which electrical steel sheets 11 are laminated, and a magnet 20 that is fixed to an inside of a magnet slot 12 through resin 30. The magnet slot 12 is provided in the laminated iron core 10 and extends in an axis direction. As shown in FIG. 1, end plates 13, 14 sandwich the rotor core 100 from both end surfaces of the rotor core 100 in a lamination direction, and a shaft 15 is fitted into a center of the rotor core 100, and the rotor core 100 is fixed to the shaft 15 by a nut 16.

As shown in FIG. 1, the resin 31 is molded between an inner wall surface of the magnet slot 12 and an outside surface of the magnet 20, and resin 32 is molded between axial end surfaces 21 of the magnet 20, and the end plates 13, 14, respectively. The resin 31, 32 may be made of, for example, epoxy, phenol, and polyimide, but is not limited to these. Instead, the resin 31, 32 may be made of silicon, styrene, polyethylene, phenol, and so on.

Figure 2:
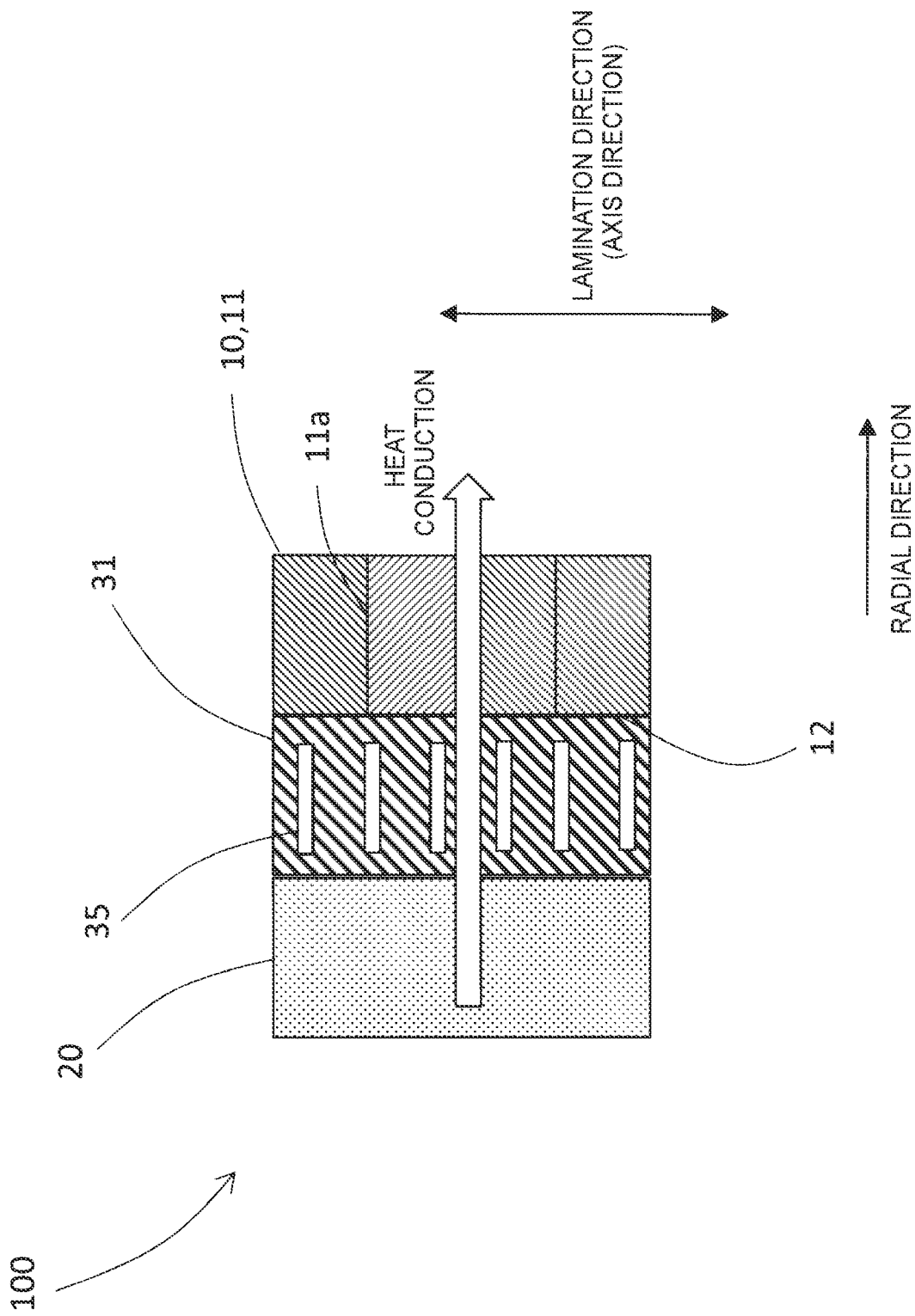
FIG. 2 is a detailed sectional view of portion A shown in FIG. 1.

As shown in FIG. 2, the resin 31 contains fillers 35. Each of the fillers 35 is a non-magnetic body and has an elliptical shape, a rectangular shape, a linear shape, or a belt shape in which a length in a longitudinal direction is larger than a length in a width direction. A material may be, for example, $SiO_2$, $Al_2O_3$, h-BN (or c-BN), AlN, $Si_3N_4$, and BeO. The filler 35 is oriented inside the resin 31 so that its longitudinal direction is directed towards a surface of the magnet 20. For example, as shown in FIG. 2, the longitudinal direction of the filler 35 is oriented in a radial direction along a lamination surface 11a of the electrical steel sheet 11.

Figure 3:
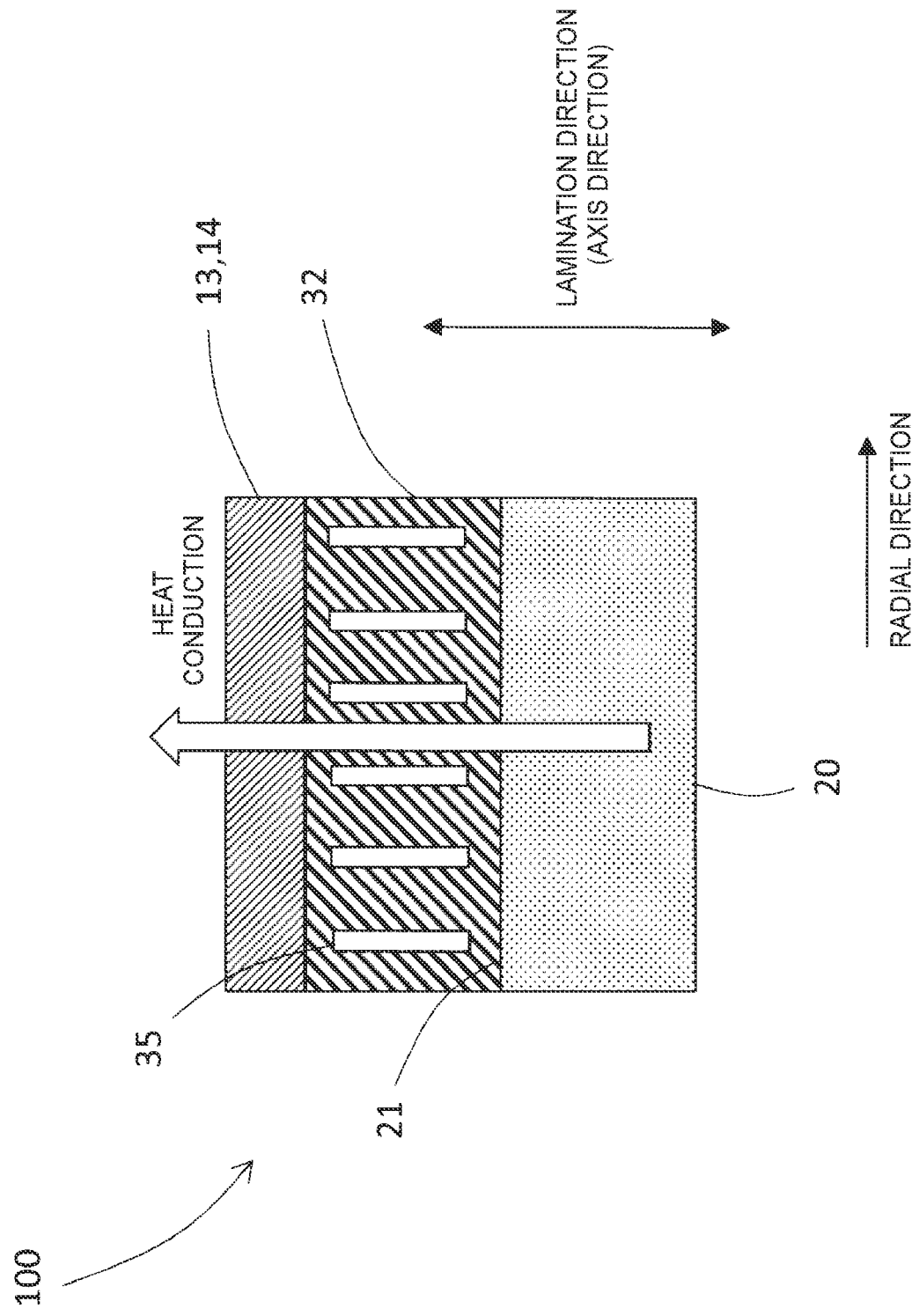
FIG. 3 is a detailed sectional view of portion B shown in FIG. 1.

Further, as shown in FIG. 3, the resin 32 also contains the fillers 35 similar to those in the resin 31. Similarly to the fillers 35 inside the resin 31, each of the fillers 35 inside the resin 32 is oriented in the resin 32 so that its longitudinal direction is directed towards the surface of the magnet 20. As shown in FIG. 3, the filler 35 inside the resin 32 may be oriented so that its longitudinal direction corresponds to the axis direction.

Thermal conductivity of the resin 31, 32 increases in the direction in which the fillers 35 are oriented. Therefore, the fillers 35 inside the resin 31 shown in FIG. 2 transmit heat generated in the magnet 20 to the electrical steel sheets 11 on an outer side in the radial direction, and transmit the heat from an outer peripheral surface of the laminated iron core 10 to the outside. Thus, heat of the magnet 20 is transmitted efficiently to the outer side in the radial direction. Also, heat generated in the magnet 20 is transmitted from the resin 32 to the outside through the end plates 13, 14. As shown in FIG. 3, since the longitudinal direction of the fillers 35 in the resin 32 is oriented in the axis direction, thermal conductivity of the magnet 20 from the axial end surfaces 21 to the end plates 13, 14 increases. Therefore, heat of the magnet 20 is transmitted efficiently in the axis direction.

Therefore, a quantity of heat dissipated form the surface of the magnet 20 to the outside becomes large, and heat dissipation performance of the magnet 20 to the outside is improved.

Further, since the fillers 35 are non-magnetic bodies, even when the fillers 35 come into contact with the magnet 20 or the electrical steel sheet 11, there is no influence on a behavior of an eddy magnetic flux such as a reduction in an eddy magnetic flux density. Thus, it is possible to restrain a decrease in an output of a motor.

When the rotor core 100 rotates at a high speed, large centrifugal force is applied to the rotor core 100. Therefore, in order to enhance strength of the resin 31, 32, it is preferred that a filling amount of the fillers 35 is increased. Further, by increasing the filling amount of the fillers 35, thermal conductivity is also enhanced. Therefore, cooling performance is improved further. For example, as the filling amount of the filler 35 is increased from 50 (vol %) to 70 (vol %), both the strength and the thermal conductivity are enhanced. Moreover, an increase in a diameter of the filler 35 also enhances both the strength and the thermal conductivity.

Further, in the foregoing description, each of the fillers 35 has an elliptical shape, a rectangular shape, a linear shape, or a belt shape. However, the shape of the filler 35 is not limited to these shapes as long as a length in the longitudinal direction is larger than a length in the width direction. For example, both the strength and the thermal conductivity are enhanced when the filler 35 has a shape in which crests and troughs are repeated along the longitudinal direction.

Figure 4:
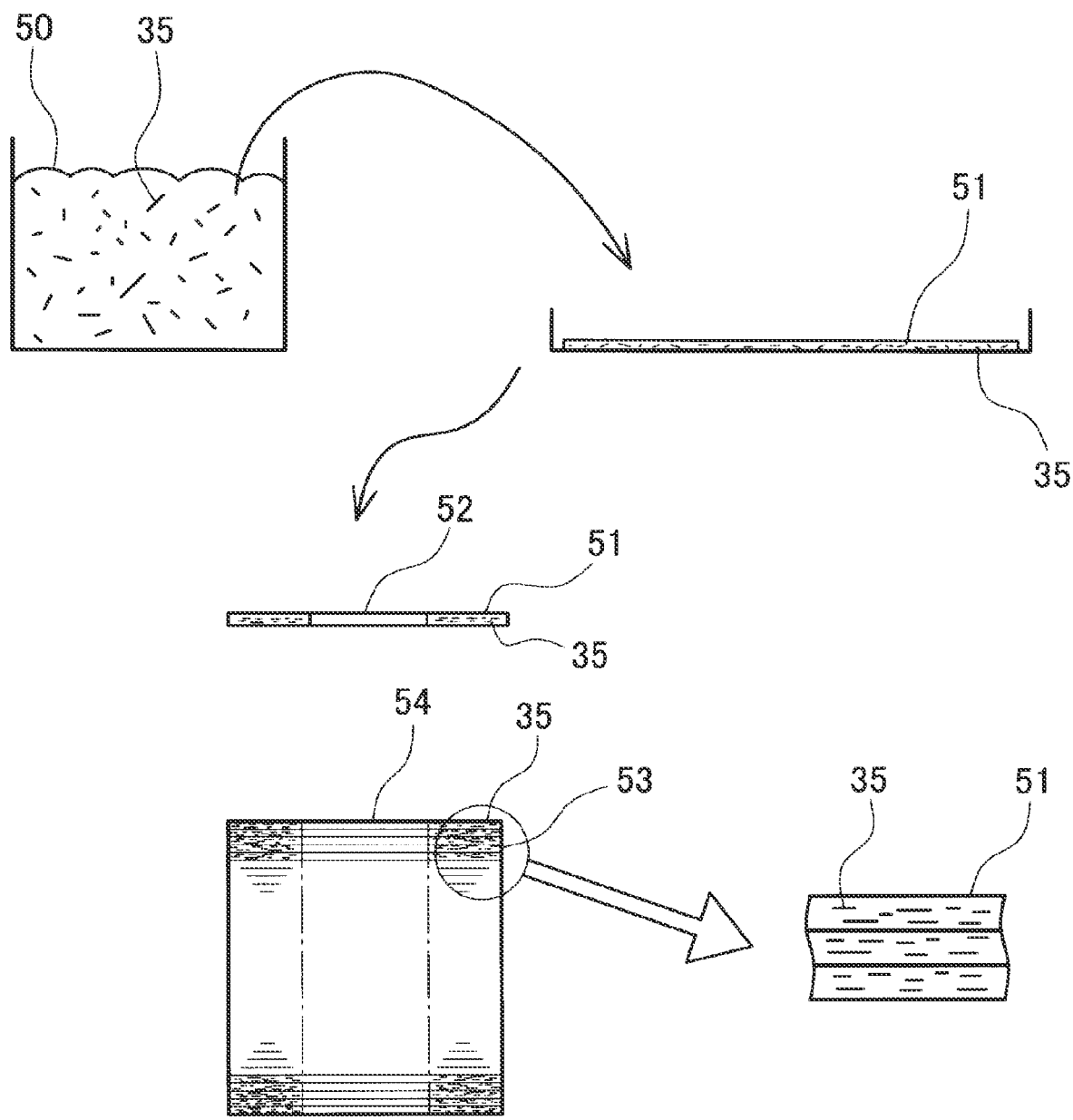
FIG. 4 is a view describing a kneading step to a lamination step of manufacturing steps for the rotor core according to the embodiment.
Figure 6:
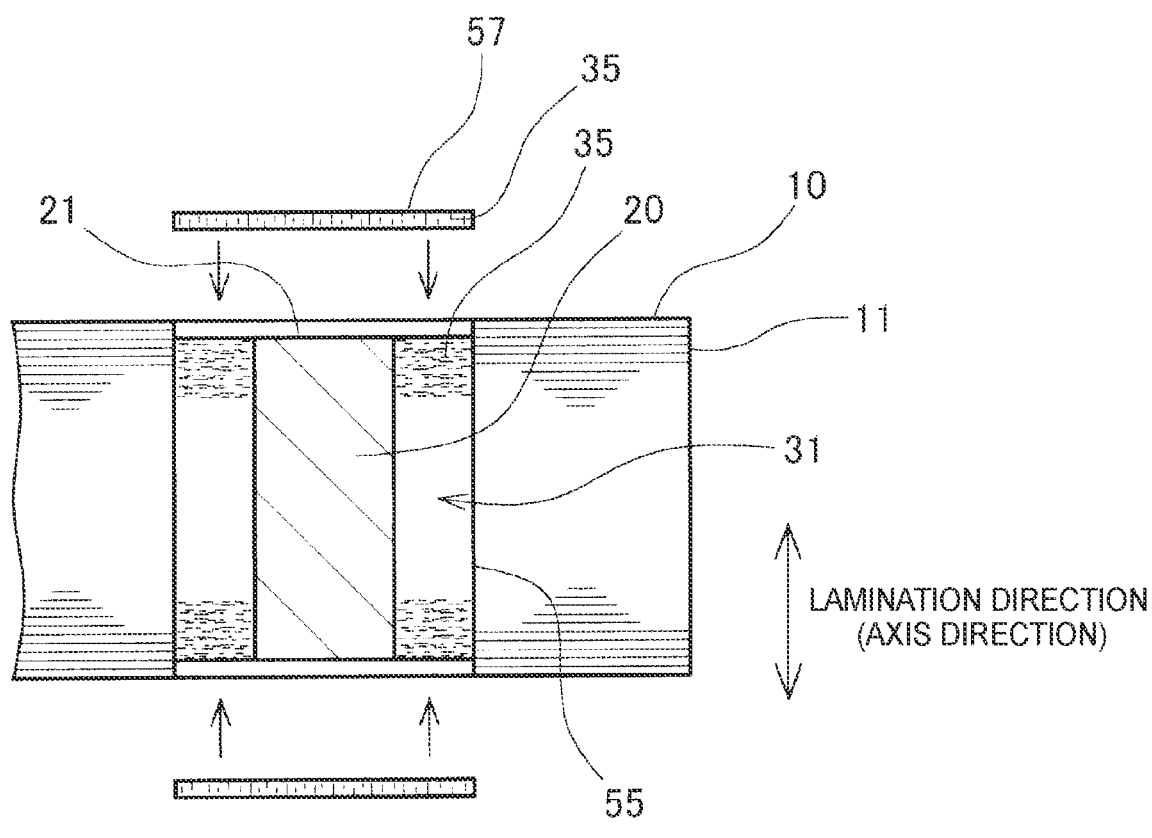
FIG. 6 is a view describing a part of the fixing step of the manufacturing steps for the rotor core according to the embodiment.

Next, with reference to FIG. 4 to FIG. 6, an example of a manufacturing method for the rotor core 100 is described. As shown in FIG. 4, the fillers 35 are kneaded with a resin material 50, and a kneaded matter is made. The kneaded matter is shaped into a flat plate shape on a flat plate, dried, and formed into a thin sheet 51 (a sheet forming step). Directions of the fillers 35 inside the sheet 51 are different from each other.

Next, a through-hole 52 is made where the magnet 20 is inserted. Also, an external shape of the sheet 51 is punched so as to have an inner shape of the magnet slot 12. At the time of punching, the sheet 51 is pressed simultaneously so that the fillers have the same orientation. Then, a large number of the sheets 51 are laminated, and a laminate 53 is thus formed (a lamination step). A magnet mounting hole 54 where the magnet 20 is mounted is formed inside the laminate 53.

Next, as shown in an upper view of FIG. 5, the magnet 20 is inserted into the magnet mounting hole 54 of filler resin 55, thereby forming a magnet resin assembly 56. Then, as shown in a lower view in FIG. 5, the magnet resin assembly 56 is inserted into the magnet slot 12 of the laminated iron core 10.

Next, as shown in FIG. 6, filler resin 57 is disposed on the axial end surfaces 21 of the magnet 20. In the filler resin 57, the fillers 35 are oriented in a thickness direction. The filler resin 57 may be, for example, the filler resin 55 that is formed by pressing and cut out with a given thickness in the lamination direction.

As described above, the filler resin 55 is disposed between the magnet 20 and the inner surface of the magnet slot 12 so that the direction of a lamination surface 51a of the sheet 51 is directed towards the surface of the magnet 20, and the filler resin 57 is disposed on the axial end surfaces 21 of the magnet 20. Thus, the longitudinal direction of the filler 35 is oriented towards the surface of the magnet 20.

Once the filler resin 55, 57 is disposed, the rotor core 100 is heated, and the filler resin 55, 57 is partially melted and then heated and cured, thereby forming the resin 31, 32. Then, the magnet 20 is fixed to the laminated iron core 10 through the resin 31, 32 (a fixing step).

With the manufacturing method described above, due to the resin 31, 32 in which the filler 35 is oriented so that its longitudinal direction is directed towards the surface of the magnet 20, the magnet 20 is fixed to the laminated iron core 10.

An example of the manufacturing method for the rotor core 100 is described above. However, the manufacturing method for the rotor core 100 is not limited to this. For example, a thermosetting adhesive may be applied to an outside surface of the magnet resin assembly 56 before the magnet resin assembly 56 is inserted into the magnet slot 12 so that the adhesive fixes the magnet 20. Also, a resin material 50 may be injected in a gap between the magnet resin assembly 56 and the inner surface of the magnet slot 12 so that the magnet 20 is fixed. Further, the sheets 51 may be laminated and pressed without making the through-hole 52 so that a block-shaped filler resin 55 is formed in which the fillers 35 are oriented in a direction along the lamination surfaces 51a of the sheets 51. Then, the block-shaped filler resin 55 may be cut in the lamination direction and inserted as a plate-shaped member between the inner surface of the magnet slot 12 and the outside surface of the magnet 20, and heated, so that the resin material 50 is injected into a gap, or an adhesive may be disposed in the gap so that the magnet 20 is fixed.

What is claimed is:

1. A rotor core comprising:
   a laminated iron core in which electrical steel sheets are laminated, the laminated iron core providing a magnet slot that extends in a lamination direction of the laminated iron core; and
   a magnet that is fixed to an inside of a magnet slot through resin,
   the resin including a filler, and the filler having a length in a longitudinal direction larger than a length in a width direction, the filler being oriented such that the longitudinal direction is directed towards a surface of the magnet.

2. The rotor core according to claim 1, wherein the filler is a non-magnetic body.

3. A manufacturing method for a rotor core,
   the rotor core including a laminated iron core in which electrical steel sheets are laminated, the laminated iron core providing a magnet slot that extends in a lamination direction of the laminated iron core, and a magnet that is fixed to an inside of the magnet slot through filler resin, the filler resin including a filler,
   the manufacturing method comprising:
   kneading step that kneads the filler and a resin material, the filler having a length in a longitudinal direction larger than a length in a width direction;
   forming step that forms a sheet by shaping a kneaded matter made of the filler and the resin material into a flat plate shape and drying the shaped kneaded matter;
   laminating step that makes a laminate by laminating the sheet;
   pressing step that makes the filler resin by pressing the laminate in a lamination direction such that the longitudinal direction of the filler is oriented so as to be directed along a lamination surface; and
   fixing step that fixes the magnet to the magnet slot through the filler resin by disposing the filler resin between the magnet and an inner surface of the magnet slot such that the lamination surface of the sheet is directed towards a surface of the magnet.

* * * * *